United States Patent
Sasaki et al.

(10) Patent No.: US 7,066,231 B2
(45) Date of Patent: *Jun. 27, 2006

(54) WASTELESS TYPE LAMINATION SYSTEM

(75) Inventors: Naotaka Sasaki, Kiryu (JP); Shunichi Kawamata, Kiryu (JP); Kenji Sugaya, Kiryu (JP); Hideaki Ito, Kiryu (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/379,597

(22) Filed: Mar. 6, 2003

(65) Prior Publication Data

US 2003/0178149 A1    Sep. 25, 2003

(30) Foreign Application Priority Data

Mar. 19, 2002  (JP) .............................. 2002-076666

(51) Int. Cl.
*B32B 37/00*  (2006.01)

(52) U.S. Cl. ...................... 156/517; 156/378; 156/543; 156/555

(58) Field of Classification Search ................ 156/256, 156/264, 263, 270, 350, 351, 353, 354, 355, 156/362, 378, 521, 308.2, 517, 555, 556, 156/543, 559, 580, 538, 364, 583.1, 519, 156/578, 510

See application file for complete search history.

(56) References Cited

U.S. PATENT DOCUMENTS

| | | | | |
|---|---|---|---|---|
| 4,570,870 A | * | 2/1986 | Ito ............................ | 242/422.5 |
| 5,552,986 A | * | 9/1996 | Omura et al. .................. | 701/45 |
| 5,783,024 A | * | 7/1998 | Forkert ....................... | 156/351 |
| 5,987,284 A | * | 11/1999 | Lewis ......................... | 399/249 |
| 6,315,020 B1 | * | 11/2001 | Seki ........................... | 156/351 |
| 6,367,379 B1 | * | 4/2002 | Toda ........................... | 101/220 |
| 6,736,179 B1 | * | 5/2004 | Ito et al. ..................... | 156/351 |

FOREIGN PATENT DOCUMENTS

JP        11048551 A  *  2/1999

* cited by examiner

*Primary Examiner*—James Sells
(74) *Attorney, Agent, or Firm*—Birch, Stewart, Kolasch & Birch, LLP

(57) ABSTRACT

A wasteless type lamination system comprises a first transfer device for transferring along a first transfer path a continuous laminate film; a cutter for cutting the continuous laminate film in a predetermined length, provided beside the first transfer path at the downstream of the first transfer device; a second transfer device for transferring along the first transfer path a cut laminate film; a film detection sensor for detecting a leading edge of the continuous laminate film, provided beside the first transfer path at the downstream of the cutter; a card transfer device for transferring a card along a second transfer path; and a thermocompression bonding device for laminating the cut laminate film to the card. The continuous laminate film is moved backward from the cutter by a predetermined distance by the first transfer device before or after cutting action of the cutter.

4 Claims, 4 Drawing Sheets

WASTELESS TYPE LAMINATION SYSTEM

BACKGROUND OF THE INVENTION

1. Field of the Invention

The present invention concerns a wasteless type lamination system for thermocompression bonding of a transparent film on a surface of a card such as an ID card.

2. Description of the Prior Art

In a conventional lamination system, a transparent film cut into a predetermined size and mounted on a base sheet (a carrier) is torn from the base sheet and is laminated on a surface of a card by thermocompression bonding. Such lamination system is undesirable in view of the operation cost and the protection of environment, since the base sheet used is thrown away as waste material.

To solve such problem, a wasteless type lamination system has been developed and is being practically used.

In this lamination system, a leading edge of a continuous transparent laminate film is drawn out from a supply roll; then, transferred along a film transfer path; then, cut in a predetermined length by a cutter; and then, further transferred along the film transfer path until the laminate film reaches a point of convergence where it meets a printed ID card.

On the other hand, the printed ID card is transferred to the point of convergence along a card transfer path.

At the point of convergence, the cut laminate film is laid on the printed ID card, and then, the cut laminate film and the printed ID card are further transferred to a thermocompression bonding place where the cut laminate film is laminated on the surface of the ID card by thermocompression bonding using a heat roller provided there.

Such wasteless type lamination system is advantageous in view of the operation cost and the protection of environment, since the laminate film is used after being cut in a necessary length and the base sheet is not used.

However, in the wasteless type lamination system of the prior art as explained above, it sometimes happens that a looseness is formed by some cause in the continuous transparent laminate film between the cutter and a transfer roller for transferring the laminate film toward the cutter. If such looseness is formed, the laminate film of the length corresponding to the looseness may pass through between the blades of the cutter after the cutter is operated. Thus, if the cutter is operated again for initialization, for example, the laminate film that has passed through between the blades of the cutter is cut off by the cutter. Thus, a small piece of the laminate film that often gets in between the card and the laminate film is produced. If the lamination is made with the small piece of the laminate film between the card and the laminate film, there are problems that the laminate film is wasted and the quality of the lamination is deteriorated.

SUMMARY OF THE INVENTION

It is an object of the present invention to solve the above problems and to provide a wasteless type lamination system capable of avoiding the waste of film and the deterioration of the quality of the lamination by preventing the small piece of the laminate film due to the looseness from being produced.

To achieve the above object, a wasteless type lamination system according to a preferred embodiment of the present invention comprises: a first transfer means for transferring along a first transfer path a continuous laminate film with a heat adhesive layer on a surface and drawn out from a supply roll; a cutting means for cutting the continuous laminate film in a predetermined length, provided beside the first transfer path at the downstream of the first transfer means; a second transfer means for further transferring along the first transfer path a cut laminate film in the predetermined length; a film detection means for detecting a leading edge of the continuous laminate film, provided beside the first transfer path at the downstream of the cutting means; a card transfer means for transferring a card along a second transfer path that converges with the first transfer path at a point of convergence; and a thermocompression bonding means for laminating the cut laminate film, laid on a surface of the card transferred, to the card, provided at the downstream of the point of convergence, in which the continuous laminate film is moved backward, in the direction upstream of the cutting means, by a predetermined distance, by the first transfer means before or after cutting action of the cutting means.

In the wasteless type lamination system according to the preferred embodiment of the present invention, since the continuous laminate film is moved backward by a distance corresponding to a looseness estimated to be formed in the continuous laminate film, before or after cutting action of the cutting means, a foreign matter such as a small piece of the laminate film is not produced by the cutting action of the cutting means. Accordingly, the waste of film and the deterioration of the quality of the lamination can be avoided.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
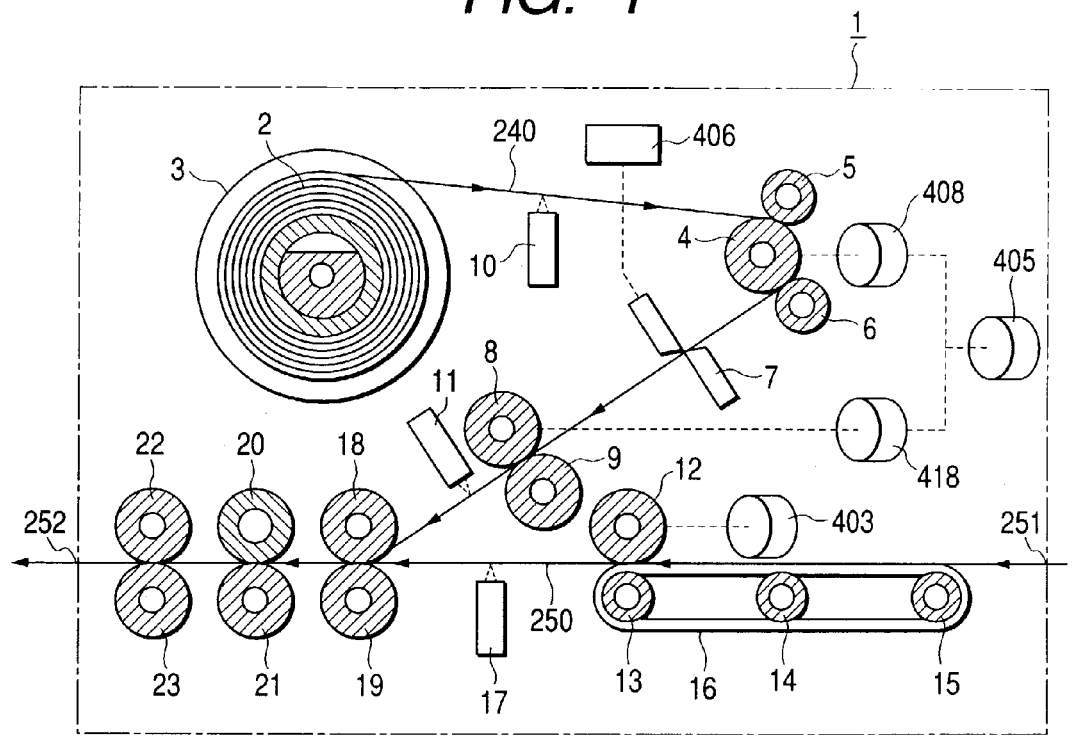
FIG. 1 is a schematic front view of a wasteless type lamination system according to an embodiment of the present invention.

FIG. 1 is a schematic front view of a wasteless type lamination system 1 according to an embodiment of the present invention.

A transparent continuous laminate film having a thermocompression bonding layer on a surface is loaded in a supply roll 2 mounted on a supply spindle 3. A leading edge of the laminate film is drawn out from the supply roll 2 and transferred along a film transfer path 240, which is a first transfer path.

A laminate film supply monitoring sensor 10 composed of an optical sensor represented by a reflective type optical sensor is provided beside the film transfer path 240 and monitors the supply of the continuous laminate film.

The continuous laminate film is transferred through a roller 4 composing a first transfer means, then, passed between two cutting blades of a cutter 7, which is a cutting means, then, transferred through a second transfer means composed of rollers 8 and 9, and then, further transferred under a film detection sensor 11, which is a film detection means, composed of an optical sensor also represented by a reflective type optical sensor.

The cutter 7 is driven by "on/off" signal from a cutter drive unit 406.

Distance between the cutter 7 and the film detection sensor 11 is set to be a predetermined design value of the system.

On the other hand, a printed ID card is put into an inlet 251 of the lamination system 1. Then, the printed ID card is transferred on a belt 16 driven by rollers 13 to 15, and then, transferred along a card transfer path 250, which is a second transfer path, being held by the belt 16 located on the roller 13 and a roller 12 opposing the belt 16. Then, the printed ID card is transferred to a point of convergence, which is composed of rollers 18 and 19, at which the film transfer path 240 and the card transfer path 250 converge, after being positioned for registration using a detection signal detected by a card edge detection sensor 17 composed of an optical sensor also represented by a reflective type optical sensor. The rollers 12 to 15 and the belt 16 compose a card transfer means.

Drive force of a laminate film transfer motor 405 is transmitted to the roller 4 through a laminate load electric clutch 408. The drive force is further transmitted to rollers 5 and 6 through the roller 4 and the respective gears (not illustrated). Similarly, the drive force is transmitted to a roller 8 through a laminate feed electric clutch 418, and from the roller 8 to a roller 9 through a gear (not illustrated).

In this embodiment, a stepping motor is adopted as the laminate film transfer motor 405. Since an amount of rotation of a stepping motor can be precisely and easily controlled by controlling the number of drive pulses, amounts of rotation of the roller 4 and the roller 8 can also be precisely and easily controlled.

Further, by combining "on/off" controls of the laminate load electric clutch 408 and the laminate feed electric clutch 418 with the rotation control of the motor, transfer of the laminate film can be made more minutely.

The printed ID card is transferred by a drive force of a card transfer motor 403. If a stepping motor is also adopted as the card transfer motor 403, transfer of a card can be more minutely controlled by controlling the number of drive pulses for the card transfer motor 403.

The drive force of the card transfer motor 403 is transmitted to a roller 12, and then, from a drive shaft (not illustrated) of the roller 12 to rollers 13 and 18, a heat roller 20 and a roller 22 through such as gears and/or synchronous belts (not illustrated). The drive force is further transmitted from these rollers to rollers opposing these rollers through the respective gears (not illustrated).

Additionally, the laminate film transfer motor 405 can be omitted and the drive force of the card transfer motor 403 may be transmitted to the rollers in the film transfer system through electric clutches.

Further additionally, although stepping motors are used as the drive sources of the laminate film transfer motor 405 and the card transfer motor 403 in the above explained embodiment, servomotors equipped with rotation sensors such as rotary encoders may be used as the drive sources in place of the stepping motors.

Figure 2:
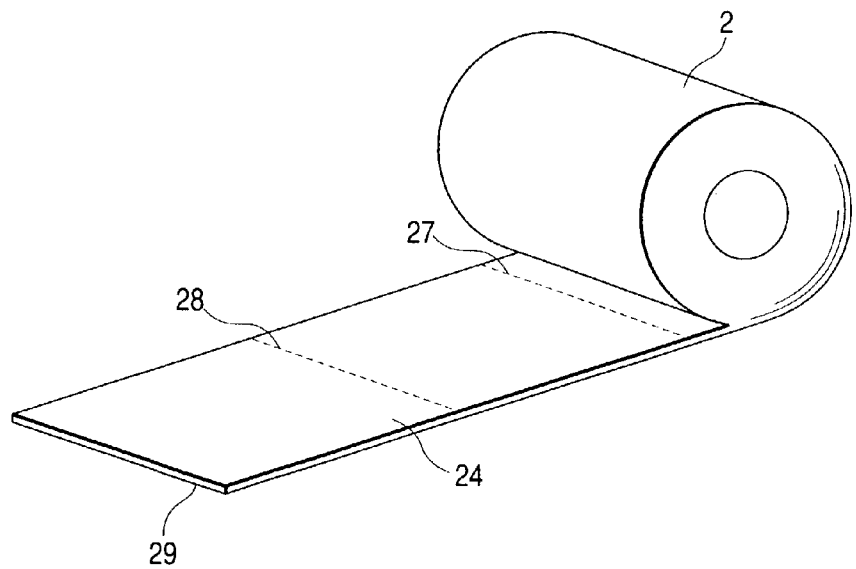
FIG. 2 is a schematic perspective view of an example of a supply roll of a laminate film suitable for use in the practice of the embodiment of the present invention.

FIG. 2 is a schematic perspective view of an example of a supply roll 2 of a laminate film 24 suitable for use in the practice of the embodiment of the present invention. As shown in FIG. 2, the leading edge 29 of a continuous laminate film 24 is drawn out from the supply roll 2 and cut successively along a cutting line 28, a cutting line 27 and so forth by the cutter 7. The continuous laminate film 24 may be a transparent film, or may be a film treated to have a hologram surface for preventing from forgery.

Figure 3:
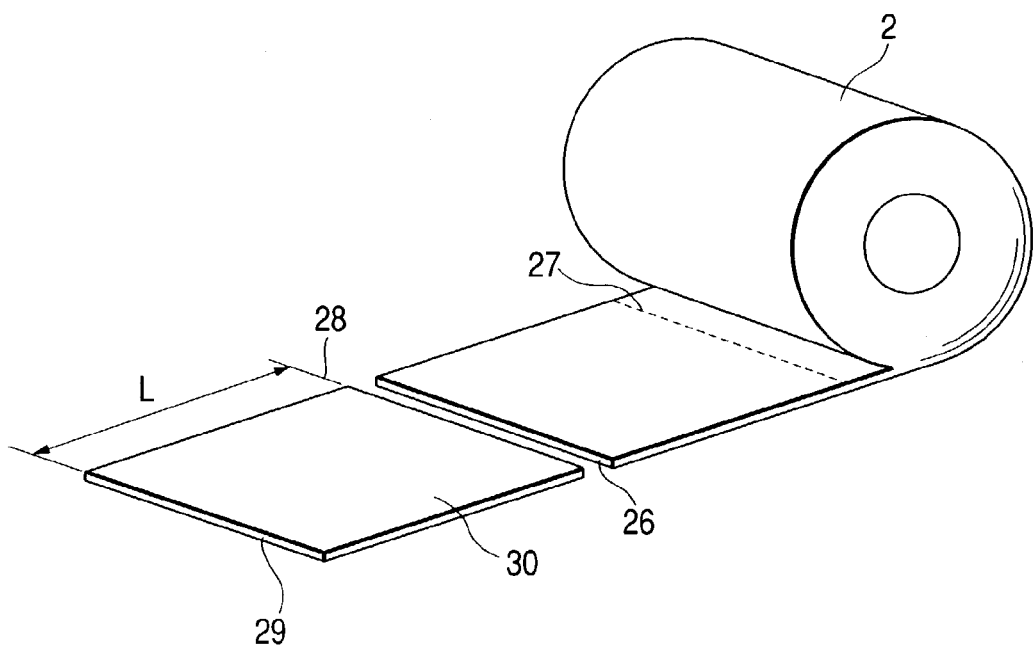
FIG. 3 is a schematic perspective view of the supply roll of the laminate film in FIG. 2 after the laminate film is cut from the supply roll.

FIG. 3 is a schematic perspective view of the supply roll 2 of the laminate film 24 in FIG. 2 after the laminate film 24 is cut from the supply roll 2. As shown in FIG. 3, the continuous laminate film 24 is cut along the cutting line 28 at a distance L from the leading edge 29, a cut laminate film 30 is made, and a new leading edge 26 is formed.

Referring again to FIG. 1, the cut laminate film 30 is laid on the printed ID card at the above mentioned point of convergence. Then, the printed ID card and the cut laminate film 30 are transferred to a place between the heat roller 20 and a platen roller 21 composing a thermocompression bonding means provided at the downstream, and are laminated there by thermocompression bonding. After that, the laminated ID card is transferred through rollers 22 and 23 to be discharged from an outlet 252 of the wasteless type lamination system 1.

Figure 4:
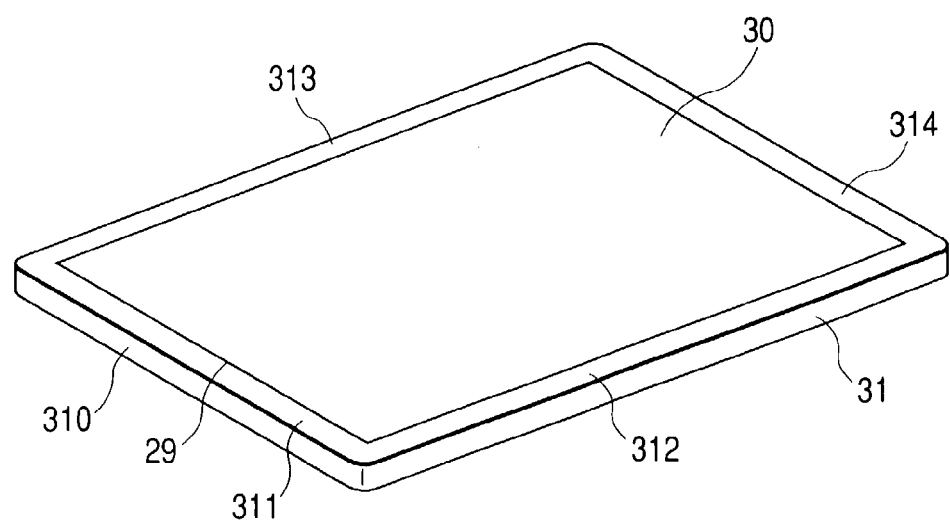
FIG. 4 is a perspective view of a printed ID card on a surface of which the cut laminate film is bonded by the wasteless type lamination system according to the embodiment of the present invention.

FIG. 4 is a perspective view of the printed ID card 31 on a surface of which the cut laminate film 30 is bonded by the lamination system according to the embodiment of the present invention. As shown in FIG. 4, the cut laminate film 30 is laminated on the printed ID card 31 with blank spaces 311 to 314 along four sides of the printed ID card 31. Accordingly, the cut laminate film 30 and the printed ID card 31 are transferred being controlled respectively to have a proper positional relation between them so that the desired blank spaces 311 to 314 are provided on the ID card 31.

In the meantime, if a foreign matter gets in between the ID card 31 and the cut laminate film 30, the quality of the laminated ID card would be seriously deteriorated. Accordingly, it is necessary to make no foreign matter is brought, particularly, in the film transfer path 240.

Figure 5:
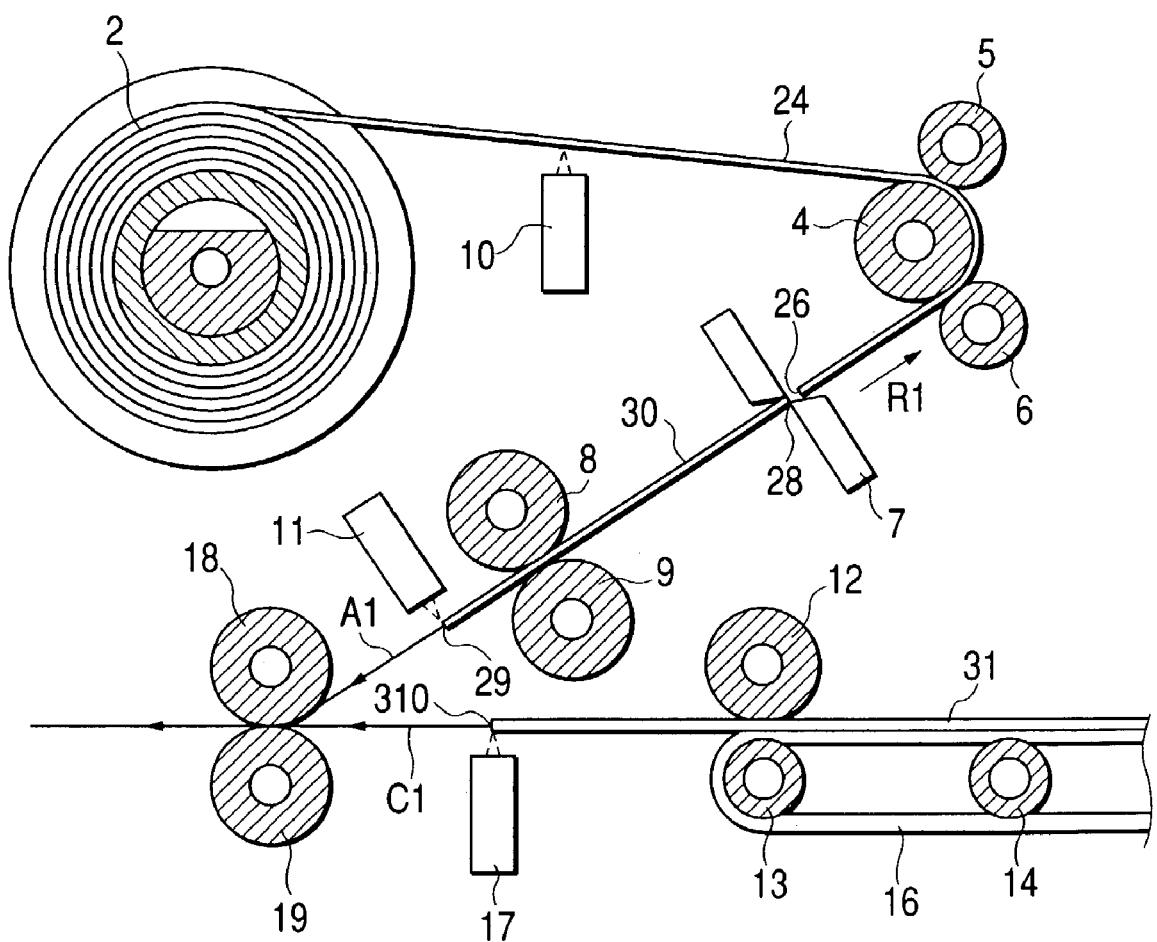
FIG. 5 is a schematic front view of a part of the wasteless type lamination system according to the embodiment of the present invention, immediately after the laminate film is cut.

FIG. 5 is a schematic front view of a part of the wasteless type lamination system 1 according to the embodiment of the present invention, immediately after the laminate film 24 is cut.

At the start, both the laminate load electric clutch 408 and the laminate feed electric clutch 418 (FIG. 1) are made "connected" state capable of transmitting the drive force. The leading edge 29 of the continuous laminate film 24 drawn out from the supply roll 2 is transferred passing through between the blades of the cutter 7 being driven by the drive force of the laminate film transfer motor 405 (FIG. 1). When the leading edge 29 of the continuous laminate film 24 is detected by the film detection sensor 11, the output signal of the film detection sensor 11 is activated. Based on the change in the output signal of the film detection sensor 11, the wasteless type lamination system 1 judges that the length of the continuous laminate film 24 existing between the cutter 7 and the film detection sensor 11 has become a predetermined length L to be cut, and stops the laminate film transfer motor 405 to stop momentarily the transfer of the continuous laminate film 24. Then, the cutter 7 is driven to make the cut laminate film 30 having the predetermined length L on the film transfer path 240.

After that, the laminate feed electric clutch 418 is made "disconnected" state, then, the laminate film transfer motor 405 is rotated in reverse to make the continuous laminate film 24 move backward, in the direction indicated by an arrow R1, by a distance corresponding to a looseness estimated to be formed in the continuous laminate film 24. Then, the laminate film transfer motor 405 is stopped. As the result, the leading edge 26 of the continuous laminate film 24 moves backward away from the blades of the cutter 7 and no continuous laminate film 24 remains between the blades of the cutter 7. For example, when the power source of the wasteless type lamination system 1 is connected after once disconnected by some reason, initialization of the systems including detection of the datum points of the drive systems in the wasteless type lamination system 1 is conducted. In this initialization, the cutter 7 is driven to make a dummy cutting action. Since no continuous laminate film 24 exists between the blades of the cutter 7 when the cutter 7 is driven to make the dummy cutting action, no small piece of the laminate film that may often get in between the card and the laminate film in the prior art is produced.

After that, the laminate feed electric clutch 418 is made "connected" state, the laminate load electric clutch 408 is made "disconnected" state, and then, the laminate film transfer motor 405 is rotated forward. (FIG. 1.) Thus, the drive force of the laminate film transfer motor 405 is transmitted to the rollers 8 and 9 through the laminate feed electric clutch 418, and the cut laminate film 30 is transferred in the direction indicated by an arrow A1.

The above explained motion of the wasteless type lamination system 1 according to the embodiment of the present invention is controlled by a controller comprising units such as microprocessors.

Figure 6:
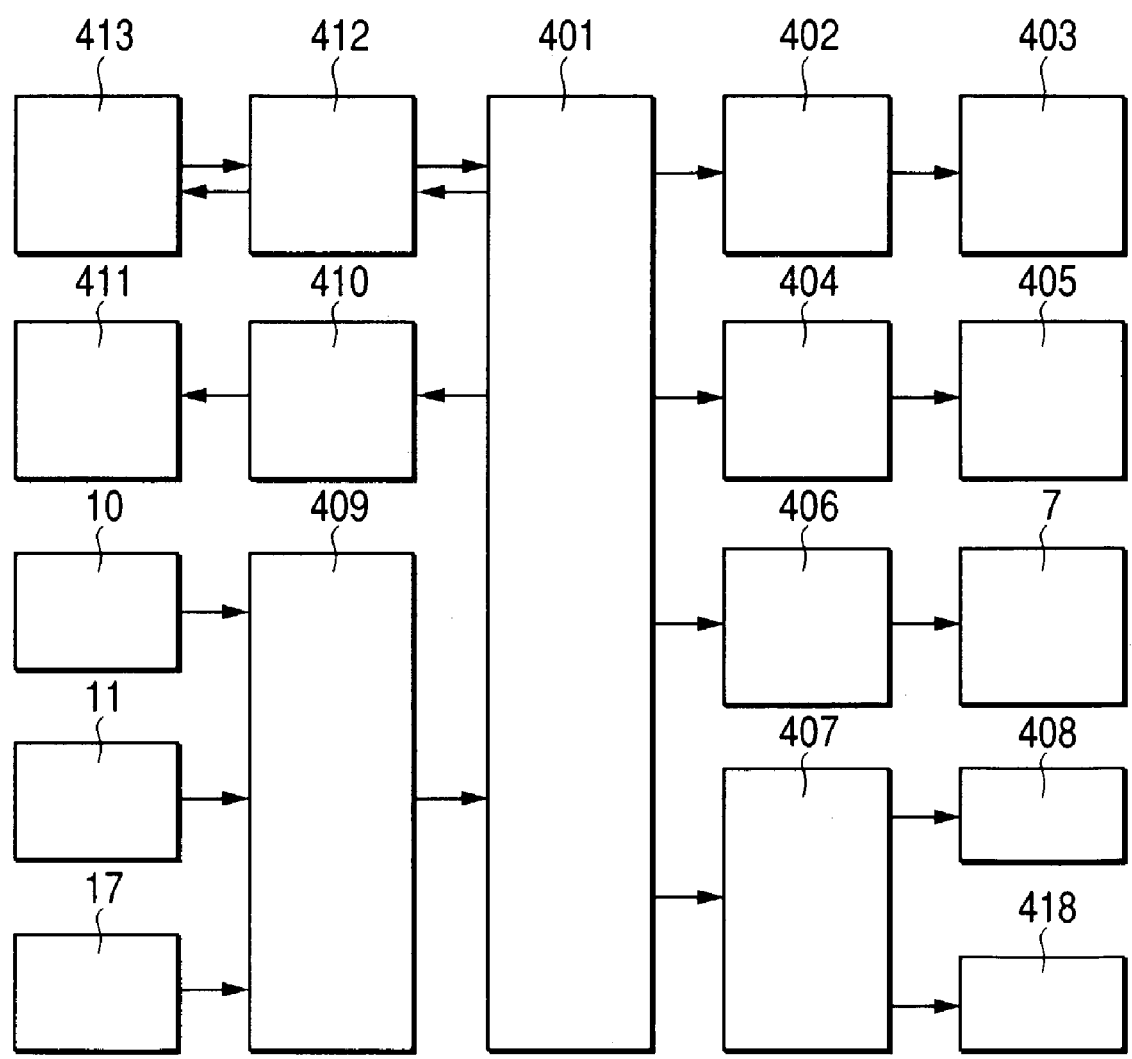
FIG. 6 is a block diagram of a controller for controlling the wasteless type lamination system according to the embodiment of the present invention.

FIG. 6 is a block diagram of the controller for controlling the lamination system 1 according to the embodiment of the present invention.

The controller comprises a computation and processing unit 401, a card transfer control unit 402, the card transfer motor 403, a laminate film transfer control unit 404, the laminate film transfer motor 405, a cutter drive unit 406, the cutter 7, a clutch drive unit 407, the laminate load electric clutch 408, the laminate feed electric clutch 418, a sensor signal processing unit 409, a heater temperature control unit 410, a heater 411, a control panel signal processing unit 412 and a control panel 413.

The laminate load electric clutch 408 connects or disconnects driving force of the laminate film transfer motor 405 to the roller 4. The laminate feed electric clutch 418 connects or disconnects driving force of the laminate film transfer motor 405 to the roller 8. The rollers 5 and 6 are connected to the roller 4 through gears provided with respective shafts. Also, the rollers 8 and 9 are connected with each other through gears provided with respective shafts. The rollers 12 to 15 provided beside the card transfer path 250 are driven by the drive force of the card transfer motor 403 and transfer the ID card 31. (FIG. 1)

Operation of the controller for the lamination system 1 according to the embodiment of the present invention is as follows.

First, the computation and processing unit 401 makes, through the laminate film transfer control unit 404, the laminate film transfer motor 405 rotate to draw out the continuous laminate film 24 from the supply roll 2. At the same time, the computation and processing unit 401 makes the laminate load electric clutch 408 and the laminate feed electric clutch 418 "connected" state through the clutch drive unit 407. Then, the roller 4 and the roller 8 are rotated being synchronized with each other, and the laminate film 24 is transferred until the leading edge 29 reaches a responsive position of the film detection sensor 11. (FIG. 5)

When the leading edge 29 of the laminate film 24 reaches the responsive position of the film detection sensor 11, the output of the film detection sensor 11 becomes activated. The activated output signal is transmitted through the sensor signal processing unit 409 into the computation and processing unit 401.

The computation and processing unit 401 stores temporarily the point at which the activated signal is transmitted as a position information in an internal memory. The position information is used later as a reference point for transmitting the cut laminate film 30 into the downstream being synchronized with the transfer of the printed ID card 31.

When the computation and processing unit 401 receives the activated output signal, it instructs, through the laminate film transfer control unit 404, the laminate film transfer motor 405 to stop rotation. At the same time, the computation and processing unit 401 drives, through the cutter drive unit 406, the cutter 7 to cut the laminate film 24.

After the laminate film 24 is cut, the computation and processing unit 401 makes the laminate feed electric clutch 418 "disconnected" state through the clutch drive unit 407. Then, the computation and processing unit 401 makes, through the laminate film transfer control unit 404, the laminate film transfer motor 405 rotate in reverse by a predetermined number of rotation. Thus, the continuous laminate film 24 is moved backward by a predetermined distance.

After that, the computation and processing unit 401 makes the laminate feed electric clutch 418 "connected" state and the laminate load electric clutch 408 "disconnected" state through the clutch drive unit 407. Then, the computation and processing unit 401 makes the laminate film transfer motor 405 rotate forward through the laminate film transfer control unit 404. Thus, the cut laminate film 30 is transferred in the direction indicated by an arrow A1 in FIG. 5.

On the other hand, the output signal of the card edge detection sensor 17 that detects the leading edge 310 of the printed ID card 31 (FIG. 4) is transmitted to the computation and processing unit 401 through the sensor signal processing unit 409. The point at which the leading edge 310 of the printed ID card 31 is detected is temporarily stored as the position information in the internal memory of the computation and processing unit 401 and is referred to as the reference point for the succeeding control of the transfer of the printed ID card 31. Thus, the printed ID card 31 is transferred along the card transfer path 250 (FIG. 1) in the direction indicated by an arrow C1 in FIG. 5. The amount of the transfer of the printed ID card 31 is controlled by the roller 12 connected to the card transfer motor 403 that is controlled by a command pulse signal.

Similarly, the cut laminate film 30 is also transferred being synchronized with the printed ID card 31 along the laminate film transfer path 240 (FIG. 1).

The cut laminate film 30 is laid on the printed ID card 31 at the point of convergence of the film transfer path 240 and the card transfer path 250 without getting foreign matter such as a small piece of the laminate film in between the printed ID card 31 and the cut laminate film 30. Then, the cut laminate film 30 and the printed ID card 31 are transferred to the place between the heat roller 20 and the platen roller 21 provided at the downstream. In the central portion of the heat roller 20, the heater 411 is provided. Temperature of the heater 411 is controlled by the heater temperature control unit 410 to make the temperature at the surface of the heat roller 20 proper for the lamination. Thus, the cut laminate film 30 is certainly laminated on the surface of the printed ID card 31 by thermocompression bonding.

In the above explanation of the present invention, the explanation is made for a case in which the card transfer motor 403 and the laminate film transfer motor 405 are provided separately as the drive sources of the lamination system. Alternatively, a single motor may be used in place of the two motors. The single motor is connected to a plurality of electric clutches to connect/disconnect drive force to the respective rollers.

Also in the above explanation, the continuous laminate film 24 is moved backward immediately after the laminate film 24 is cut. The continuous laminate film 24 may be moved backward immediately before the next cutting action.

Also, although the explanation is made for a case in which the reflective type optical sensors are used as the sensors for detecting such as the laminate film and the printed ID card, sensors of other types may also be used.

Additionally, PVC is generally being used as the materials of the ID card to be laminated. The wasteless type lamination system 1 of the present invention can be used for a card made of a composite material such as PET-G, and further, the wasteless type lamination system 1 of the present invention can be used for any card regardless of the material of which the card is made.

Further additionally, the object to be laminated by the wasteless type lamination system 1 of the present invention is not limited to an ID card. The wasteless type lamination system 1 of the present invention is applicable to a lamination of a continuous film, being successively cut, on a substrate in the form other than ID card by modifying accordingly.

Further, the wasteless type lamination system 1 of the present invention can be applied to a dual sided wasteless type lamination system by which both faces of a card is simultaneously laminated.

In the lamination system 1 according to the embodiment of the present invention as explained above, since the continuous laminate film 24 is moved backward by a distance corresponding to a looseness estimated to be formed in the continuous laminate film 24, immediately after the laminate film 24 is cut, or before the next cutting action, a foreign matter such as a small piece of the laminate film is not produced by the cutting action of the cutter 7. Accordingly, the waste of film and the deterioration of the quality of the lamination can be avoided.

What is claimed is:

1. A wasteless type lamination system comprising:
a first transfer means for transferring along a first transfer path a continuous laminate film with a heat adhesive layer on a surface and drawn out from a supply roll;
a cutting means for cutting said continuous laminate film in a predetermined length, provided beside said first transfer path at the downstream of said first transfer means;
a second transfer means for further transferring along said first transfer path a cut laminate film in said predetermined length;
a film detection means for detecting a leading edge of said continuous laminate film provided adjacent said first transfer path at a position downstream of said cutting means, said film detection means including a sensor which generates a signal when said leading edge of said continuous laminate film is detected;
a card transfer means for transferring a card along a second transfer path that converges with said first transfer path at a point of convergence; and
a thermocompression bonding means for laminating said cut laminate film, laid on a surface of said card transferred, to said card, provided at the downstream of said point of convergence,
wherein a leading edge of said continuous laminate film is moved backward, in the direction upstream of said cutting means, by a predetermined distance, by said first transfer means before or after cutting action of said cutting means, and
means to move said continuous laminate film in a forward direction or, alternatively, in a rearward direction, said means adapted to releasably engage one or more of said first or second transfer means whereby said first transfer means may be caused to move said laminate film either forward or backward along said first transfer path, said leading edge of said continuous laminate film when moved backward being moved by a distance estimated to correspond to slack formed in said continuous film laminate subsequent to being cut by said cutting means to said predetermined length, and said second transfer means may be caused to move said cut laminate film forward along said transfer path, so as to remove any laminate film from said cutting means.

2. The system according to claim 1, wherein said means to move said continuous laminate film in a forward or rearward direction comprises motor means.

3. The system according to claim 2, wherein said motor means releasably engages said first or second transfer means by means of a clutch.

4. The system according to claim 2, wherein said first and second transfer means comprise rollers.

* * * * *